Dec. 13, 1960 J. F. BELL 2,964,623

RECEIVER HAVING TWO INPUT SOURCES AND RESPECTIVE TUNING MEANS, ONE OF WHICH, WHEN SELECTED, GROUNDS THE NON-USED SOURCE FOR BOTH INCOMING INTERFERENCE AND OUTGOING RADIATION SIGNALS

Filed Feb. 11, 1958

Inventor
John F. Bell
By Francis W. Crotty
Attorney

United States Patent Office 2,964,623

Patented Dec. 13, 1960

2,964,623

RECEIVER HAVING TWO INPUT SOURCES AND RESPECTIVE TUNING MEANS, ONE OF WHICH, WHEN SELECTED, GROUNDS THE NON-USED SOURCE FOR BOTH INCOMING INTERFERENCE AND OUTGOING RADIATION SIGNALS

John F. Bell, Wilmette, Ill., assignor to Zenith Radio Corporation, a corporation of Delaware Filed Feb. 11, 1958, Ser. No. 714,538

2 Claims. (Cl. 250—20)

This invention pertains to television receivers and is particularly concerned with an arrangement for preventing interference from undesired signals that may be concurrently received with other signals intended to be utilized by the receiver.

Commercial television broadcasting as initiated employed channels spaced throughout the segment of the frequency spectrum extending from 54 to 216 megacycles and currently referred to as the VHF band. It was not long after the commencement of commercial television broadcasting that it was necessary to allocate additional spectrum space to accommodate the growth of the broadcasting industry and this resulted in the assignment of another band to television, namely, the band extending from 470 to 890 megacycles referred to as the UHF band. In order to receive television signals, whether they be transmitted in one or the other of such bands, it has been the practice to employ in effect two tuning arrangements in television receivers. One of these employs a tuner which accepts signals in the VHF band only and a second tuner designed to accept signals in the UHF band only. A second and more attractive approach to the problem, however, contemplates the use of UHF tuning strips that are particularly adapted to tuners of the turret type. A turret type tuner is characterized by the fact that it accommodates a series of tuning strips and each such strip is designed to accept a particular television channel. By appropriate selection of parameters, any strip may receive a channel in the VHF band or in the UHF band and thus the turret tuner may serve an area which has both VHF and UHF channels.

Whatever expedient is adopted, the receiver is of necessity a two-band instrument and oftentimes has separate antenna and input networks or selectors for the VHF and UHF bands. The receiver further has a device which is operated to render the VHF or UHF selector instantaneously operative at the election of the user. In any event, the same intermediate-frequency signal is established whether reception is on the VHF band or on the UHF band. A popular value of intermediate frequency is 40 megacycles but that gives rise to a difficult interference problem since the police communication band is also at approximately 40 megacycles.

It is found that during the reception of UHF signals, an unwanted signal very close in frequency to the intermediate frequency of the receiver is picked up by the VHF antenna and, in the absence of elaborate precautions, results in interference. An initial solution to this problem proposed grounding the VHF input or antenna circuit to the turret chassis during reception of UHF signals. While that expedient could reduce interference from the undesired signal by shunting it to ground, it gave rise to an equally undesirable result, namely, radiation from the local oscillator. This occurred because the turret shaft and outer shield carry substantial amounts of oscillator power due to capacity and inductive coupling between the oscillator coil and the turret shaft, and the UHF strip chassis, which is, in turn, connected to the rotor center shield. For this reason, oscillator voltage is applied to the VHF antenna if the output of that antenna is connected between the UHF chassis and the turret wall.

In another proposed solution, it was recognized that a capacitance exists between the terminal of the UHF strip to which the VHF antenna input connects and the terminal of that strip to which the grid of the first tube, which on UHF is the first I.F. amplifier, connects. An inductor was connected across these two terminals to provide a high impedance therebetween at the 40 mc. frequency. This affords some measure of relief but is not the most satisfactory solution because the coil is undesirably large and costly.

It is, therefore, an object of the present invention to provide an arrangement which avoids the aforementioned limitations of prior art devices and yet protects a VHF—UHF television receiver from interfering signals.

It is another object of the invention to provide a new, improved and simplified arrangement for effectively protecting a VHF—UHF television receiver from unwanted and undesirable interferring signals.

It is a specific object of the invention to provide an improved arrangement for a television receiver, providing effective relief from unwanted signals the frequency of which is close to the intermediate frequency developed in the receiver.

The invention has particular utility in a wave signal receiver for selectively responding to signals in a first and a second frequency band but subject also to undesired signals at least during the reception of signals in the first band. The invention is embodied in a signal selector which comprises a first signal input system responsive to signals in the first band and including a filter element having a point returned to a signal ground plane and a second signal input system responsive to signals in the second band and concurrently responsive to the undesired signals. First selector means having a signal reference plane responds to signals from the first signal input system while second selector means is provided for responding to signals from the second signal input system. Additionally, coupling means are provided for selectively coupling the first and second selector means with their respective signal input systems. However, when the first selector means is coupled to the first signal input system it is subject to respond to the undesired signals present in the second signal input system by virtue of the fact that these undesired signals have energy on the reference plane which is at a finite potential with respect to the ground plane. Impedance means are therefore provided which couple the second signal input system to a terminal of the filter element so that when the first selector means is coupled to the first signal input system this impedance means furnishes a reactance of a value that creates a bypass for the undesired signals from the second signal input system through the filter element to the signal ground plane.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which corresponding components are identified by like reference characters and in which:

Figure 1:
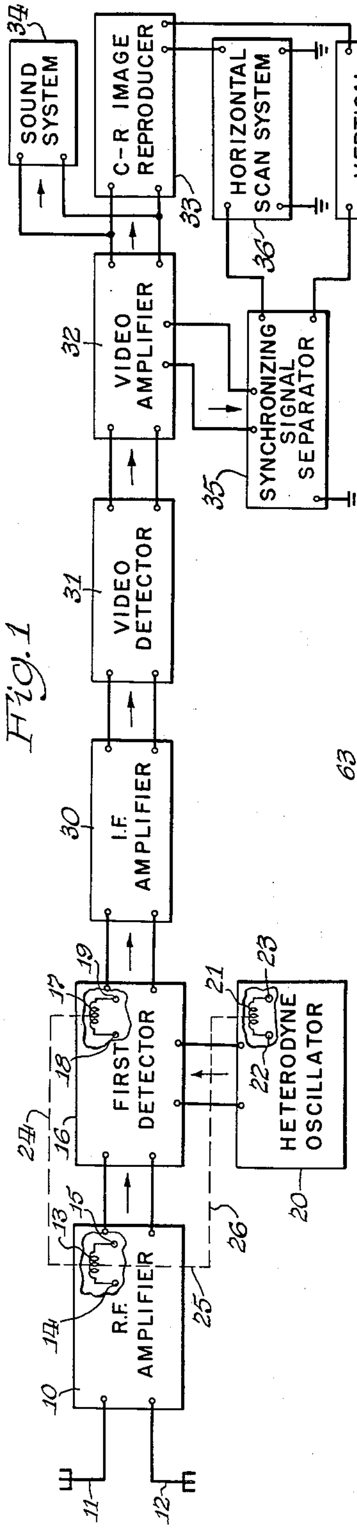
Figure 1 shows a television receiver capable of receiving signals in both the VHF and UHF bands and to which the present invention is especially well suited.

Referring now more particularly to Figure 1, the receiver there represented for accommodating television signals transmitted in either the VHF or UHF band is generally similar to that disclosed and claimed in United States Letters Patent 2,596,117 issued on May 13, 1952, in the name of John F. Bell et al. and assigned to the same assignee as the present invention. It will be understood to be a receiver featuring a turret tuner having a series of tuning strips detachably secured to a turret structure which is rotatable to bring any selected strip into operating relation with the remainder of the receiver circuitry in the manner described in the aforementioned patent. Since turret tuners, as such, are well known in the art it is not deemed necessary to illustrate the structure of the mechanism and it has been omitted from the drawing for the sake of simplicity.

Considering the receiver circuit in more detail, it comprises a radio-frequency amplifier 10 having input terminals to which is connected an antenna system 11, 12. More will be said concerning the antenna system hereinafter, but for the purpose of an overall description of the receiver suffice it to say that the antenna indicated schematically is one for intercepting and applying to the input circuit of amplifier 10 television signals transmitted in both the UHF and the VHF bands for selection, one from the other, on the basis of the selectivity of amplifier 10. The RF selector of amplifier 10 includes an inductor 13 which is represented as connected to a pair of contacts 14, 15. Where the receiver is of the turret tuned type, as is assumed form the case under consideration, inductor 13 is mounted on a tuning strip and contacts 14, 15 are companion terminals of that strip to which the inductor is soldered and through which the inductor is connected into the circuitry of amplifier 10 by engagement of strip contacts 14, 15 with stationary contacts of the tuning system included in that amplifier.

A first detector or heterodyne stage 16 is coupled to amplifier 10 and similarly has a tuning inductor 17 with associated contacts 18, 19. This inductor and its contacts are likewise included on the same tuning strip. A heterodyne oscillator 20 is connected to detector 16 and it, too, has a tuning inductor 21 connected to strip terminals 22, 23. The broken-construction lines 24, 25, 26 which interconnect inductors 13, 17 and 21 represent symbolically unicontrolled tuning of amplifier 10, heterodyned oscillator 20 and the first detector. This unicontrol tuning is, of course, accomplished by rotation of the turret turner which presents triads of inductors to the amplifier, oscillator and detector as each tuning strip is, in its turn, brought into operating relation with the receiver circuitry. The inductors of each triad are related in value to the end that each such strip tunes the amplifier, oscillator and detector to select one signal for utilization by the receiver. The correlation of these inductors determines whether that signal is a selected channel in either the VHF or UHF band.

Connected in cascade to detector 16 are an intermediate-frequency amplifier 30 of any desired number of stages, a second or video detector 31, and a video amplifier 32 of any desired number of stages which feeds the input circuit of a conventional cathode-ray type image reproducer 33. Where the receiver is of the intercarrier type, as is conventional in current practices, the intercarrier sound component developed in video detector 31 is taken off at the output terminals of video amplifier 32 and supplied to a sound system 34. That system will be considered to include an intercarrier amplifier, sound detector, audio amplifier and sound signal reproducer such as the usual loudspeaker. Another output circuit of video amplifier 32 is connected with a synchronizing-signal separator 35 which, in turn, is connected with synchronizing circuits of a horizontal-scanning system 36 and a vertical-scanning system 37. The output terminals of these scanning systems connect with the horizontal and vertical deflection windings associated with image-reproducing device 33 in conventional manner.

In operation, the turret turner is rotated to a selected one of is preset positions to accomplish simultaneous or unicontrolled tuning of amplifier 10, oscillator 20 and first detector 16 for the purpose of selecting a desired channel or television signal for utilization; whether that signal be in the VHF or UHF band is immaterial. The selected signal is accepted by amplifier 10 from antenna system 11, 12 and is fed to detector 16 wherein it is modulated with a heterodyning signal from oscillator 20 to develop an intermediate-frequency signal for application to intermediate-frequency amplifier 30. After amplification therein, the intermediate-frequency signal is detected in video detector 31 and the video components are amplified in video amplifier 32 and applied to the cathode-ray tube of image reproducer 33 to intensity modulate the cathode-ray beam thereof. The synchronizing components of the received signal are separated from video information in synchronizing-signal separator 35 and are employed to effect synchronized operation of the horizontal and vertical scanning systems 36, 37. The synchronized scanning systems supply horizontal and vertical scanning signals to the appropriate deflection elements of image reproducer 33 to cause the electron beam thereof to trace successive image rasters on the screen of the cathode-ray tube while the beam is concurrently modulated with the video information of the received signal. In this fashion, an image is reproduced representing the received signal. At the same time, an intercarrier component, conveying the sound program which accompanies the video information, is applied to sound system 34 wherein the audio is detected, amplified and reproduced.

In most receiver systems an automatic gain control adjusts an operating bias of one or more of the amplifier stages to the end that the intermediate-frequency signal applied to video detector 31 experiences relatively small amplitude excursions in spite of a much wider range of variations in received signal strength. The arrangement under consideration may, of course, include such a gain control but it has been omitted in order to simplify the drawing.

Figure 2:
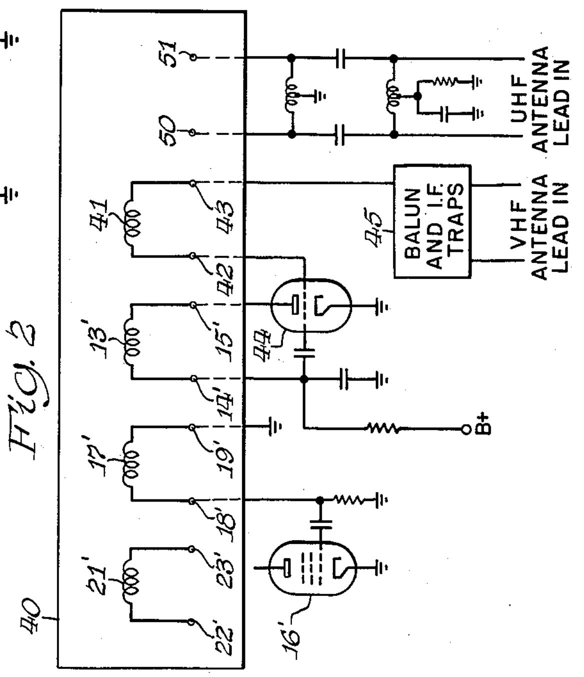
Figure 2 represents the circuitry of a tuning strip which may be employed in the receiver structure of Figure 1 for the purpose of selecting a signal in the VHF band.

A representative form of VHF tuning strip which may be accommodated by the turret tuner is shown in Figure 2. The RF amplifier coil, first detector coil, and heterodyning oscillator coil have the same reference characters as the corresponding components of Figure 1, except that the numerals are primed and the same is true of the contacts of the strip to which these several coils are connected. The strip itself is designated 40 and is a piece of insulating material such as Bakelite or an alkyd of sufficient thickness and stiffness to serve as a support for the elements to be mounted on the strip. In addition to the coils already described, this strip carries a coil 41 connected to strip contacts 42, 43. When this strip is in operating position, contact 42 connects one terminal of coil 41 to the control electrode of an amplifier tube 44 which is included in RF amplifier 10 of the overall system represented in Figure 1. At the same time, contact 43 of the strip connects the remaining terminal of coil 41 to a device 45 labeled "Balun and IF traps." The expression "Balun" is a term of art employed to designate a transforming device which transforms or converts from a balanced input to an unbalanced output. Included within the block diagram 45 along with the balun are intermediate-frequency traps which serve to increase rejection of I.F. signals entering the tuner thru the VHF antenna. The balanced terminals of unit 45 receive a balanced transmission line serving as an antenna lead-in connected to the VHF antenna of the receiver.

Thus, with strip 40 in operating position within the receiver, the VHF antenna is connected through unit 45 and coil 41 to the grid of tube 44 in amplifier 10. The design of coil 41, along with the design of the other coils of the strip, namely coils 13′, 17′ and 21′, select a particular one of the television signals that may be picked up by the VHF antenna and translate the selected signal through the receiver as described hereinbefore. It will be observed that the final terminal pair 50, 51 of strip 40 are on open circuit. These are the terminals that connect with the UHF antenna lead-in and have no function during VHF reception. The tube 16′ indicated in Figure 2 is a partial representation of the circuit of detector 16 but the circuitry of that detector may be entirely conventional. Only those components included within the full-line outline of strip 40 are, in fact, supported in the strip. The other components shown in the figure are supported on a stationary member or part of the tuner. The filter connected between the UHF lead-in and contacts 50, 51 will be described in connection with Figure 3.

Figure 3:
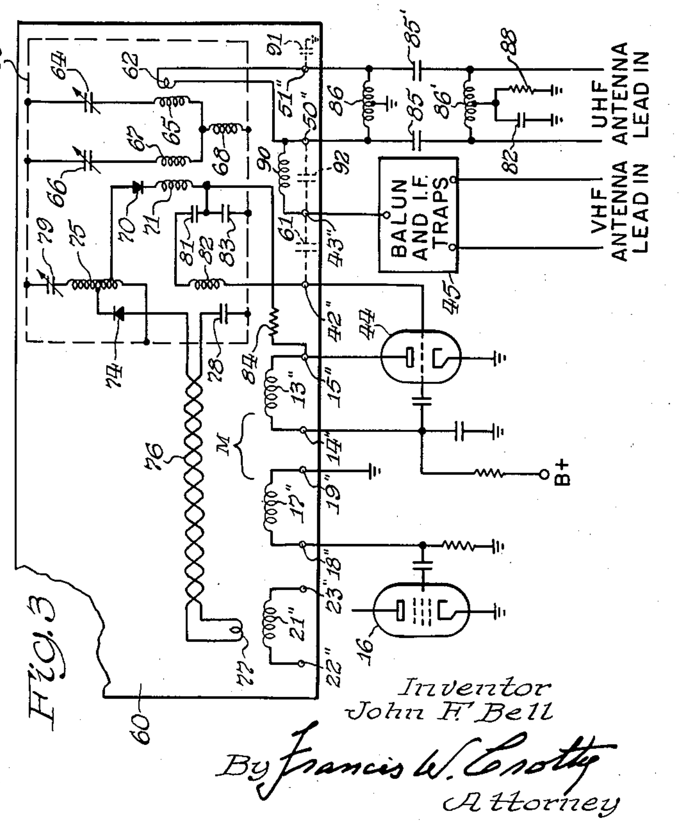
Figure 3 is a schematic representation of another tuning strip that may be employed in the receiver of Figure 1 but for the purpose of selecting a signal in the UHF band.

Figure 3 indicates a UHF strip 60 and the coils and contacts thereof which have counterparts in Figure 2 have the same reference characters but now with a double prime to facilitate distinguishing the UHF from the VHF components. It will be observed that the UHF strip has no counterpart to coil 41 and its terminals or contacts 42″, 43″ are on open circuit except for a capacitance 61 which is inherently presented between them. It will be further observed that a coupling coil 62 is connected to the UHF antenna terminals 50″, 51″. For UHF operation it is convenient to construct a heterodyne stage on the UHF strip itself in which case the signal output from the strip is at the intermediate frequency of the receiver. The heterodyne stage is enclosed within a shielded housing 63 supported on strip 60 to minimize oscillator radiation.

Included within housing 63 is a preselector network including a variable condenser 64 in series with an inductor 65 and a like combination of a variable condenser 66 and an inductor 67 in parallel with the first described combination. One terminal of the parallel network is grounded to shield 63 and the other terminal connects to the shield through a series inductor 68. Coupling to the preselector is afforded by coupling loop 62. The heterodyne stage within shield housing 63 comprises a crystal diode 70 and an inductor 71 which is coupled to inductor 67 of the preselector. A heterodyne signal is supplied to crystal 70 by virtue of a connection from the crystal to a multiplier network including another crystal diode 74, one terminal of which connects to a tap on an inductor 75 while the opposite terminal is coupled through a twisted pair connection 76, a coupling coil 77 and condenser 78 to housing 63. One free terminal of inductor 75 likewise connects to housing 63 and the other connects through an adjustable condenser 79 to the housing. An intermediate-frequency output signal is derived from crystal diode 70 through a condenser 81 and an inductor 82. Condenser 83 is a blocking condenser and the connection from crystal diode 70 through inductor 71 and a resistor 84 to contact 15″ permits a D.C. current bias for the diode in accordance with the teachings of United States Letters Patent 2,640,919, issued June 2, 1953 in the name of John F. Bell et al. and assigned to the same assignee as the present invention.

A high pass filter is interposed between the UHF antenna lead-in and coupling coil 62, the connection being made through contacts 50″, 51″ because the filter is not included on the tuning strip. The filter comprises series condensers 85, 85′ and shunt connected inductors 86, 86′. Inductor 86 is center-tapped and returned to ground which, of course, is a plane of fixed reference potential, while inductor 86′ is returned from its center tap to ground but through the parallel combination of a condenser 87 and a resistor 88. In order to reject undesired signals which will be identified more particularly hereinafter, another impedance means, specifically an inductor 90 mounted upon UHF strip 60, connects from the unbalanced VHF antenna connection to one terminal of filter inductor 86 to provide a low impedance path to ground through the center-tapped inductor 86 for such signals.

During operating intervals in which the turret is rotated to that one of its operating positions which places UHF strip 60 in operating relation to the remainder of the receiver circuit, a UHF signal is selected and translated. Its selection from other signals concurrently intercepted by the UHF antenna is determined by the parameters of the preselector network 64—68 which is conveniently preadjustable by means of variable condensers 64 and 66. The selected signal is supplied to mixer diode 70 through the coupling from the preselector network to inductor 71. The modulating signal concurrently applied to diode 70 is a harmonic of the fundamental frequency to which inductor 21″ tunes heterodyning oscillator 20 of the receiver. The fundamental oscillator signal is coupled through pick up coil 77 to the multiplier circuit including crystal diode 74, inductor 75 and condenser 79 to develop a harmonic component of the desired frequency determined by adjustment of condenser 79. Necessarily, the value of inductor 21″ and the tuning of the harmonic generator are established in relation to the tuned condition of the preselector so that the harmonic of the oscillator signal applied to mixer diode 70 heterodynes with the selected UHF signal to produce an intermediate-frequency signal corresponding to the intermediate frequency of the receiver. The intermediate-frequency signal is delivered to terminal 42″ of the terminal strip by means of condenser 81 and I.F. tuning and matching inductor 82. Contact 42″ connects with the input circuit of RF amplifier tube 44 but, during UHF reception, coil 13″ tunes that amplifier to serve as an intermediate-frequency amplifier. In like fashion coil 17″ converts detector 16 during UHF reception to function as an intermediate-frequency amplifier. As a consequence, the intermediate-frequency signal available at strip terminal 42″ is amplified in stages 10 and 16 in cascade and is then delivered to IF amplifier 30 for translation through the remainder of the receiver in the manner described above.

During reception of UHF signals, the VHF antenna may intercept an undesired signal, for example, police signals which are in the neighborhood of 40 megacycles and that is also the value assigned as the intermediate frequency of the receiver. The IF traps of unit 45 may not suppress this undesired signal adequately and therefore it may be transferred through the capacitance 61 to the output circuit of UHF strip 60, interfering with the IF signal which has essentially the same frequency. This is obviated by inductor 90 which, in conjunction with the centertapped filter impedance 86 provides a low impedance path to ground for such unwanted signals.

Inductor 90 has another useful function in its described environment. In particular, it serves to balance the impedance relations to the UHF input to avoid impedance discontinuities or interruptions so that the UHF input approximates a balanced transmission line from the antenna to coupling coil 62. There, of course, is some capacitance from UHF antenna terminal 51′ to chassis ground as indicated in the broken-line representation 91 and there is a like capacitance 92 between the companion UHF antenna terminal 50″ and VHF antenna terminal 43″. If the capacitances 91 and 92 are not balanced and, if this conditions is permitted to prevail, it imposes a non-uniformity in the impedance of the UHF antenna lead in. Inductor 90 which is across capacitance 92 in effect increases the apparent reactance thereof to arrive at a more or less balanced condition of the capacitances desired for substantially uniform impedance relations through that portion of the UHF antenna lead-in which includes the turret contacts.

In one embodiment of the invention that has been satisfactorily operated, the following parameters were employed:

| | |
|---|---|
| Coil **90** | .047 microhenry at 600 megacycles. |
| Coil **86** | 2 series-connected coils, each having .035 microhenries at 600 megacycles. |
| Condenser **91** | 1.0 micromicrofarads. |
| Capacitor **92** | 1.5 micromicrofarads. |
| Operating frequency of the UHF strip | 600 megacycles. |

In other words, the described arrangement provides the desired protection against unwanted signals that may be intercepted during operating intervals in which it is desired to utilize signals in the UHF band. This is accomplished through a minimum of added circuitry and therefore with a minimum of expense. It is also accomplished without provoking radiation from the UHF strip which has been a problem and difficulty of other approaches to the suppression of such unwanted signals.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a wave-signal receiver for selectively responding to signals in a first and a second frequency band but subject to undesired signals at least during the reception of signals in said first band, a wave-signal selector system comprising: a first signal input system responsive to signals in said first band and including a filter element having a point returned to a signal ground plane; a second signal input system responsive to signals in said second band and concurrently responsive to said undesired signals; first selector means responsive to signals from said first signal input system and including a signal reference plane; second selector means responsive to signals from said second signal input system; means for selectively coupling said selector means with their respective signal input systems, said first selector means when coupled to said first signal input system being subject to response to said undesired signals present in said second signal input system and having signal energy on said reference plane at a finite potential with respect to said ground plane; and impedance means, coupled between said second signal input system and a terminal of said filter element when said first selector means is coupled to said first signal input system, having a reactance of a value creating for said undesired signals a by-pass from said second signal input system through said filter element point to said signal ground plane.

2. In a wave-signal receiver for selectively responding to signals in a first and a second frequency band but subject to undesired signals in a third frequency band at least during the reception of signals in said first band, a wave-signal selector system comprising: a first signal input system responsive to signals in said first band and including a filter element having a point returned to a signal ground plane; a second signal input system responsive to signals in said second band and concurrently responsive to said undesired signals; first selector means, having a signal reference plane, responsive to signals from said first signal input system and including heterodyning means for developing in response to a signal selected from said first signal input system an intermediate-frequency signal in said third band; second selector means responsive to signals from said second signal input system; means for selectively coupling said selector means with their respective signal input systems, said first selector means when coupled to said first signal input system being subject to response to said undesired signals present in said second signal input system and having signal energy, derived from said heterodyning means, on said reference plane at a finite potential with respect to said ground plane; and impedance means, coupled between said second signal input system and a terminal of said filter element when said first selector means is coupled to said first signal input system, having a reactance of a value creating for said undesired signals a by-pass from said second signal input system through said filter element point to said signal ground plane, thereby preventing said undesired signals from interfering with said intermediate-frequency signal.

References Cited in the file of this patent

UNITED STATES PATENTS

| | | |
|---|---|---|
| 1,813,194 | Nordlund | July 7, 1931 |
| 2,812,433 | Stolk | Nov. 5, 1957 |
| 2,826,687 | Fisher | Mar. 11, 1958 |